Jan. 4, 1938.          I. S. LELAND          2,104,085
MOUNTING MEANS FOR GLASS VENEER
Filed March 4, 1935          2 Sheets-Sheet 2
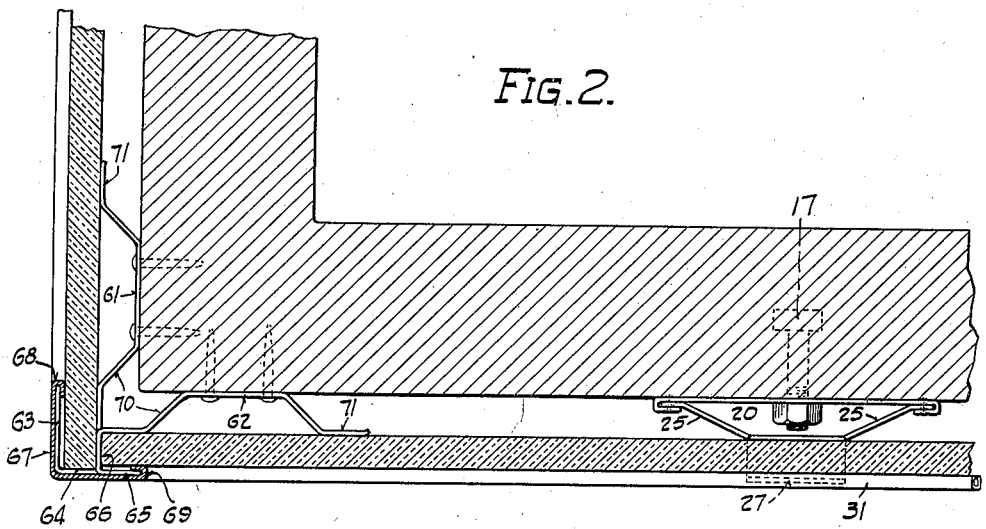
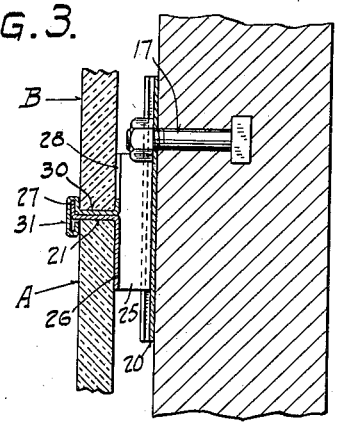
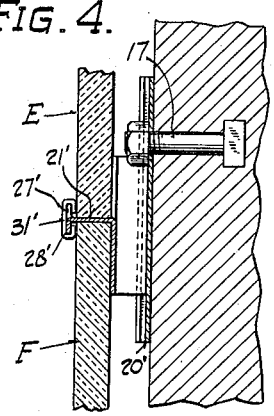
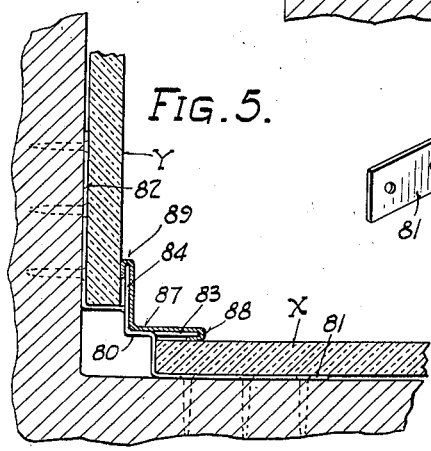
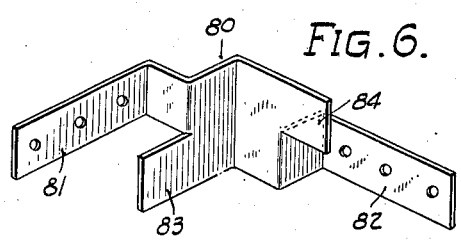
INVENTOR.
Ira S. Leland
BY
ATTORNEY.

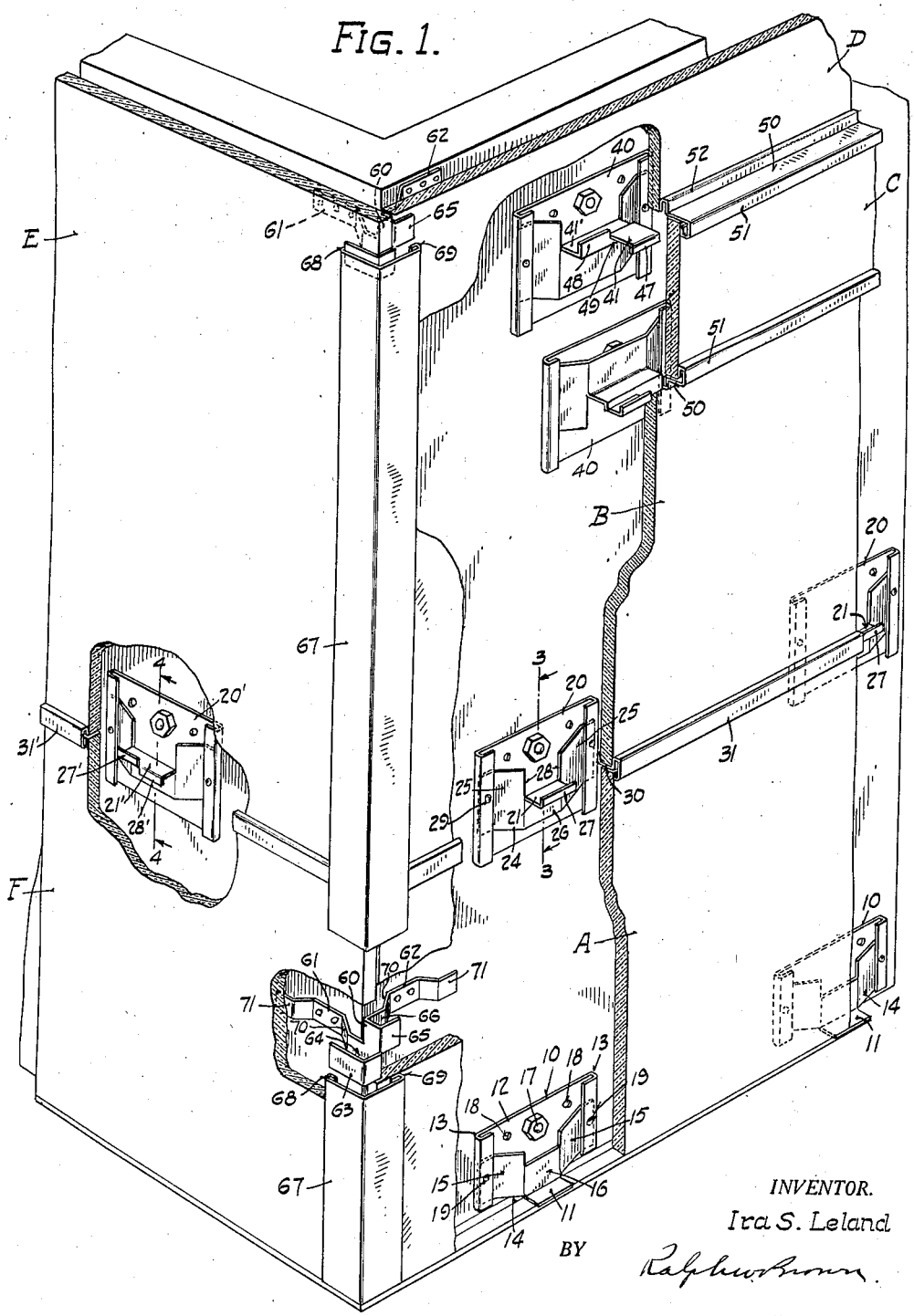

Patented Jan. 4, 1938

2,104,085

UNITED STATES PATENT OFFICE 2,104,085

MOUNTING MEANS FOR GLASS VENEER

Ira S. Leland, Milwaukee, Wis.

Application March 4, 1935, Serial No. 9,225

19 Claims. (Cl. 72—24)

This invention relates to glass veneers and particularly to mounting means therefor.

Such veneers in solid or variegated colors are now quite commonly applied over extended areas of the fronts of stores, theaters, office buildings and the like for decorative purposes. They ordinarily comprise sheets of glass arranged edge to edge and secured in place solely by a common variety of mastic pressed between the glass and the underlying structural surface and between mating edges of adjacent sheets.

By mounting the sheets in this manner the use of exposed unsightly screws or like anchors is of course eliminated and no expensive or hazardous drilling or special cutting of the glass to receive such anchor is necessary. However such mounting methods have proven quite inadequate in that the sheets soon become loose and require resetting and remounting from time to time.

One object of the present invention is to provide an improved mounting means for glass veneer which will afford a secure, permanent, and safe anchorage therefor, without impairing the appearance thereof, and without requiring any special glass drilling or cutting operations.

Other more specific objects and advantages will appear, expressed or implied, from the following description of an illustrative embodiment of the invention.

In the accompanying drawings:—

Figure 1 is a fragmentary perspective view of a glass veneer structure equipped with mounting means constructed in accordance with the present invention.

Fig. 2 is a horizontal sectional view on a larger scale.

Fig. 3 is a vertical section on the line 3—3 of Fig. 1.

Fig. 4 is a vertical section on the line 4—4 of Fig. 1.

Fig. 5 is a horizontal section illustrating a modified embodiment of the invention applied to an inward corner of a building wall.

Fig. 6 is a perspective view of the glass anchor shown in Fig. 5.

The glass veneer illustrated in Figs. 1 and 2 is shown applied over and fixed to the external surface of a building wall at and about an outward corner of the wall. In this instance the veneer comprises separate sheets of glass A, B, C, D, E, and F, the lower sheet A being supported by a series of horizontally spaced anchors, two of which are shown at 10, equipped with horizontal supporting tongues 11 which project beneath the lower edge of the sheet. The other lower sheet F is similarly supported by like anchors (not shown) and both sheets A and F are preferably seated on a layer of mastic to seal the lower edges thereof.

The anchors 10, which may assume various forms, are securely but adjustably fixed to the supporting wall by concealed means disposed behind and wholly covered by the veneer. In this instance they are formed of sheet metal and each comprises a base plate 12, having edge folds 13 at the opposite ends thereof, which receive and embrace the opposite ends of a bracket plate 14 vertically adjustable therein. Each bracket plate 14 is preferably of archlike form with angularly disposed supporting wings 15 and an intermediate portion 16 parallel to and spaced from the base plate 12. The portion 16 is arranged for contact with the inner surface of the glass to brace the same and serves to support the tongue 11 which in this instance projects from the lower edge thereof.

The base plate 12 may be secured to the wall by appropriate means, such as a bolt 17 anchored in the wall, or by nailing it to the wall through perforations 18 provided for the purpose. After the base plates 12 of the several anchors 10 are thus secured, the several bracket plates 14 are then assembled therewith and vertically adjusted in the edge folds 13 so as to position the several tongues 11 thereof in accurate horizontal alignment, in which position the bracket plates are finally fixed by indenting or crimping the metal, as at 19, by the use of a center punch or other appropriate tool. The number of anchors thus applied and the spacing of them may of course be varied in accordance with the weight and size of the sheet of glass supported by them.

The next higher sheet of glass B, though arranged with its lower edge close to the upper edge of glass A, is preferably supported substantially independently of the latter by a horizontal row of anchors 20, similar to anchors 10, and having tongues 21 which project between the adjacent edges of the upper and lower glass sheets. In this instance the tongue 21 of each anchor 20 is formed by slitting and bending forwardly the upper part of the intermediate portion 26 of the bracket plate 24 and by bending the end of the tongue 21 to form an upstanding rib 27. The intermediate portion 26 of each bracket plate 24 is disposed to bear against and brace the inner surface of the lower sheet A and the exposed ends 28 of the wings 25 are disposed to bear against and brace the inner surface of the upper sheet B. It is of course understood that the bracket plate 24 is adjustably fixed to the base plate 12 by indentations 29 produced in the manner above described.

A separator strip 30 may be interposed between the adjacent edges of the upper and lower sheets of glass to reinforce and protect the same. The strip shown is of channel form. It rests upon the tongues 21 and partially embraces the lower edge of the upper sheet B and is provided with a folded bead-like formation 31 at its exposed edge to receive and interlock with the upstanding end ribs 27 of the tongues 21. The formation 31 hides the seam between the upper and lower sheets and serves to protect and securely lock and position the sheet edges throughout their lengths.

In some instances the separator strip 30 may be omitted and a bead-like strip 31' employed to cover the seam between sheets and to protect the edges thereof. Such an arrangement is shown in Figs. 1 and 4 with a bead-like strip 31' disposed over the joint between the upper and lower sheets E and F. In this instance anchors such as shown at 20' are preferably employed, the tongue 21' of each being bent at its outer end to form upwardly and downwardly projecting ribs 27' and 28' slidably interlocked within the strip 31'.

When it is desired to offset one sheet of glass out of the plane of an adjacent sheet, anchors such as shown at 40 may be employed. These anchors are exactly similar to those hereinabove described except that one portion 41 of the glass engaging tongue thereof is extended beyond the other tongue portion 41' so as to engage with the edge of the offset sheet, the ends of the tongue portions being bent to provide downwardly and upwardly projecting ribs 47 and 48, respectively. Also the longer tongue 41 is bent intermediate its ends to form a shoulder 49 which coacts with its rib 48 to form a channel-like seat for the edge of the offset glass.

In this instance the glass sheet C is shown offset from both of the sheets D and B, arranged above and below it, so as to form a raised panel effect, the upper and lower edges of the offset sheet C being covered by protective strips 50. Each of the strips 50 has longitudinal edge folds 51 and 52 arranged to slidably receive the ribs 47 and 48, respectively, in a manner to hold the strips in place.

Provision is made in the veneer shown for securing, covering, and protecting the edges of the glass at corners of the wall structure. For this purpose a series of anchors are provided, fixed to the wall adjacent a wall corner and interengaged with edges of the glass, together with a corner strip which completely covers the edges of the glass and which is secured in place by interlocking engagement with the anchors. The anchors and covering strip may assume various forms but those which will now be described have proven entirely satisfactory.

In Figs. 1 and 2 corner anchors 60 are shown which are designed for use with an outward corner of the wall. Each is preferably formed from a single sheet metal blank longitudinally split and bent to form mounting straps 61 and 62 adapted to be nailed or otherwise fixed to the wall at opposite sides of the corner. Each is also bent to form a wing 63 which, together with a portion of the strap 61, provides a hook-like formation 64 adapted to receive and embrace an edge of one glass sheet, and a similarly formed wing 65 cooperates with the other strap 62 to provide a hook-like formation 66 to receive and embrace the edge of an adjacent glass sheet at the other side of the corner. A corner strip 67 of sheet metal of angular cross section is provided with longitudinal edge folds 68 and 69 adapted to slidably receive and interlock with the ends of the wings 63 and 65, respectively, of the several corner anchors. The strip 67 covers the corner seam between the glass sheets and adequately protects the adjacent edges of the sheets.

Although the mounting straps 61 and 62 of the anchors 60 may be flat, they are preferably bent, as indicated at 70, so that the wall engaging portions thereof are laterally offset from the glass engaging hooks 64 and 66, and so that the glass is spaced from the wall; and the ends of the straps are also preferably bent to provide bearing pads 71 adapted to contact the inner face of the glass to brace the same.

In Figs. 5 and 6 a corner anchor 80 is shown which is designed for use with inward corners of a wall. This anchor is also preferably formed from a single sheet metal blank fashioned to provide mounting straps 81 and 82 at the opposite ends thereof, each strap being laterally offset from the body of the blank. Below the strap 81 the body of the blank is extended to form a wing 83 parallel to and laterally spaced from the strap 81, so as to form a recess between them, adapted to receive and retain an edge of the glass X; and above the strap 82 a similar wing 84 is provided so as to form a corresponding recess for the edge of an adjacent sheet of glass Y. A corner covering strip 87 is also preferably provided which is bent to match the corner and which has longitudinal edge folds 88 and 89 adapted to slidably receive and interlock with the ends of the wings 83 and 84, respectively. The purpose and function of the strip 87 is the same as the strip 67 hereinabove described.

Various changes may be made in any of the embodiments of the invention hereinabove specifically described without departing from or sacrificing the advantages of the invention defined or attempted to be defined in the appended claims.

I claim:—

1. The combination with glass veneer comprising a plurality of glass sheets arranged substantially edge to edge, of means for mounting said veneer over a supporting structure, and concealed means disposed wholly behind said veneer for securing said mounting means to said structure, said mounting means having a thin projection engaged with and between edges of adjacent sheets to secure the same against displacement.

2. The combination with glass veneer comprising a plurality of glass sheets arranged substantially edge to edge, of means for mounting said veneer over a supporting wall, said mounting means comprising a plurality of anchors separately fixed to said wall, and means including tongues projecting horizontally from said anchors and engaged with and between edges of adjacent sheets to secure the same against displacement.

3. The combination with glass veneer comprising a plurality of glass sheets arranged substantially edge to edge, of means for mounting said veneer over a supporting wall, said mounting means including a plurality of spaced anchors separately fixed to said wall having tongues projecting therefrom into interlocking engagement with and between edges of adjacent sheets to secure the same against displacement.

4. The combination with glass veneer comprising a plurality of glass sheets arranged substantially edge to edge, of means for mounting said veneer over a supporting structure, said mounting means comprising a plurality of anchors fixed to said structure behind said veneer and having tongues projecting between edges of adjacent sheets, and means engaged with the exposed face of said veneer and interlocked with said tongues to secure said sheets against displacement.

5. The combination with glass veneer comprising a plurality of glass sheets arranged substantially edge to edge, of a strip covering the joint between adjacent sheets, means for mounting said veneer over a supporting structure, and concealed means behind said veneer for securing said mounting means to said structure, said mounting means projecting horizontally between edges of adjacent sheets and interlocking with said strip and coacting therewith to secure said veneer against displacement.

6. The combination with glass veneer comprising a plurality of glass sheets arranged substantially edge to edge, of means for mounting said veneer over a supporting structure, said means including a strip of sheet metal extended along and between the edges of adjacent sheets, and concealed means anchored to said structure behind said veneer and interlocked with said strip to secure said sheets against displacement.

7. The combination with glass veneer comprising a plurality of glass sheets, of means for mounting the same over a supporting wall, said mounting means comprising a base, concealed means for attaching said base to said wall, and means including a thin portion projecting horizontally from said base for interlocking engagement with the edges of said sheets to secure the same against displacement.

8. The combination with glass veneer comprising a plurality of glass sheets, of means for mounting the same over a supporting structure, said mounting means comprising a base, concealed means for attaching said base to said structure, a bracket vertically adjustable on said base, and means carried by said bracket and engageable with the opposite faces of said veneer to secure the same against displacement.

9. An anchor for mounting a panel over a supporting structure, said anchor comprising a base for attachment to said structure, a bracket mounted on said base, and a tongue projecting from said bracket and coacting with an edge of said panel to support the latter, said bracket being vertically adjustable relative to said base to thereby accurately position said tongue relative to the edge of said panel.

10. An anchor for mounting a panel over a supporting structure, said anchor comprising a base for attachment to said structure, a bracket mounted on said base and having a panel engaging arched portion spaced from said base to space the panel from said structure, and a tongue projecting from said arched portion and coacting with said panel to support the latter, said bracket being vertically adjustable relative to said base to thereby position said tongue and said panel.

11. Anchor means for mounting a panel over a supporting structure, said anchor means comprising a plurality of bases for attachment to said structure, a bracket adjustably mounted on each of said bases, and a tongue projecting from each of said brackets and coacting with an edge of said panel to support the latter, said tongues being vertically alignable by adjustment of said brackets on said bases to thereby conform the anchor means to said panel.

12. An anchor for mounting a panel over a supporting structure, said anchor comprising a base formed of a plate of metal, means for attaching said base to said supporting structure, flanges formed at each end of said base, a bracket formed of a strip of metal slidable within said flanges, said bracket being arched between said flanges to bear against said panel, and a tongue formed upon said bracket for engagement with the edge of said panel to thereby support the same.

13. The combination with a structure having angularly disposed sides forming a corner, of a panel arranged parallel to each of said sides with edges of said panels adjacent said corner, a strip covering said edges, and means attached to said structure adjacent said corner and interlocked with said edges and with said strip to anchor the same.

14. The combination with a structure having two angularly disposed sides, of a panel arranged parallel to each of said sides, each of said panels having an edge adjacent and parallel to the other to form a corner, and a plurality of anchors fixed to said structure adjacent said corner, each of said anchors having means interengaged with and between said edges to anchor the same.

15. The combination with a structure having two angularly disposed sides, of a panel arranged parallel to each of said sides, each of said panels having an edge adjacent and parallel to the other, a plurality of anchors fixed to said structure, each of said anchors having a portion extending between and contacting said adjacent edges to position said panels and also having fingers contacting the outer faces of said panels to secure said panels to said structure, and a strip engaging said fingers and each of said panels and thereby joining said panels to form a corner.

16. The combination with a structure having two angularly disposed sides, of a panel arranged parallel to each of said sides, each of said panels having an edge adjacent and parallel to the other to form a corner, a plurality of anchors bearing against said panels, each of said anchors having an arched portion secured to said structure and spaced away from said panels to thereby space said panels from said structure, each of said anchors also having means interengaged with and between said edges to anchor the same.

17. An anchor for securing glass sheets to a structure having a corner, said anchor including members for attachment to said structure at opposite sides of said corner respectively, and a portion extending outwardly from said corner and having fingers for embracing adjacent edges of said sheets.

18. An anchor for securing panels to a structure having a corner, said anchor including connected portions for engagement with adjacent edges of said panels, fingers extending from said portions for engagement with the front of said panels, members extending from said portions for engagement with the back of said panels, and means for attaching said members to said structure at opposite sides of said corner.

19. An anchor for securing panels to a structure having a corner, said anchor including connected portions for engagement with adjacent edges of said panels, fingers extending from said portions for engagement with the front of said panels, members extending from said portions for engagement with the back of said panels, and means for attaching said members to said structure at opposite sides of said corner, said members being arched to space said panel engaging portions from said structure.

IRA S. LELAND.